June 1, 1937.                F. W. WILKENS                 2,082,040
                           POWER TRANSMISSION
                         Filed Aug. 19, 1935            2 Sheets-Sheet 1
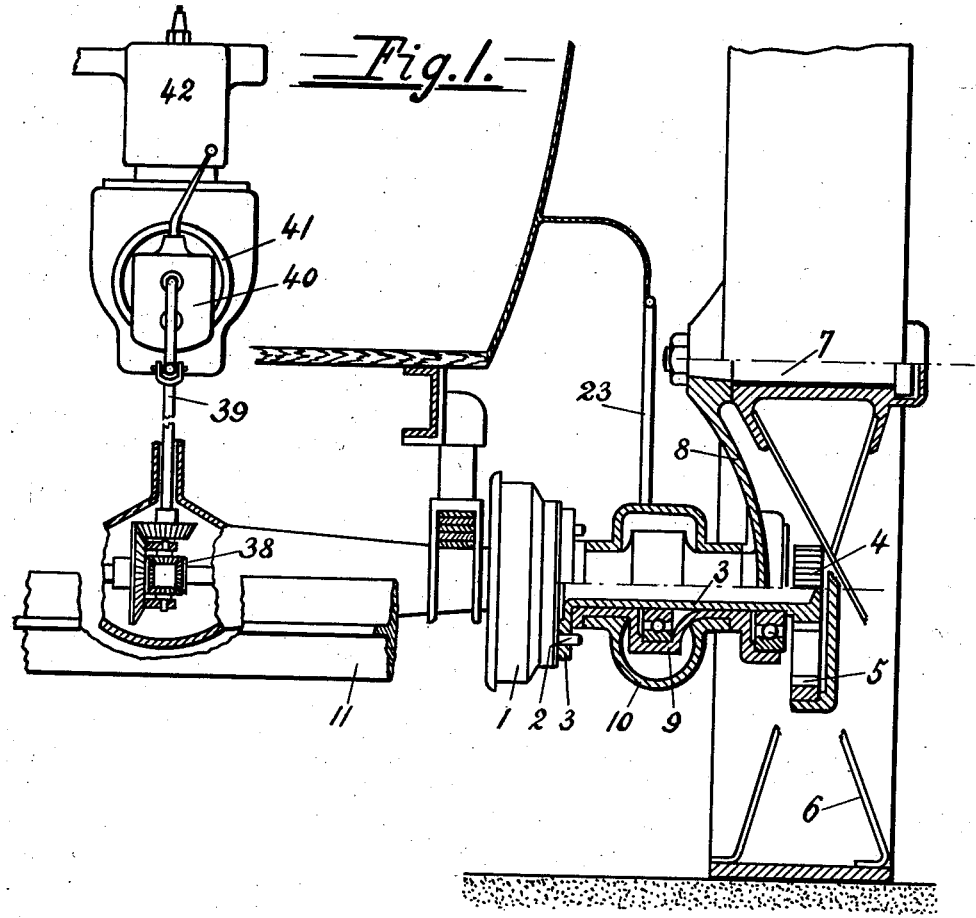
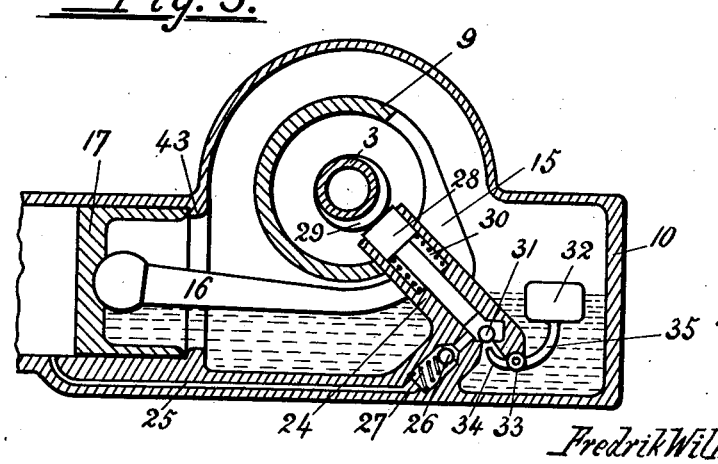
Inventor
Fredrik Wilhelmson Wilkens
per Karl A. Mayr
Attorney.

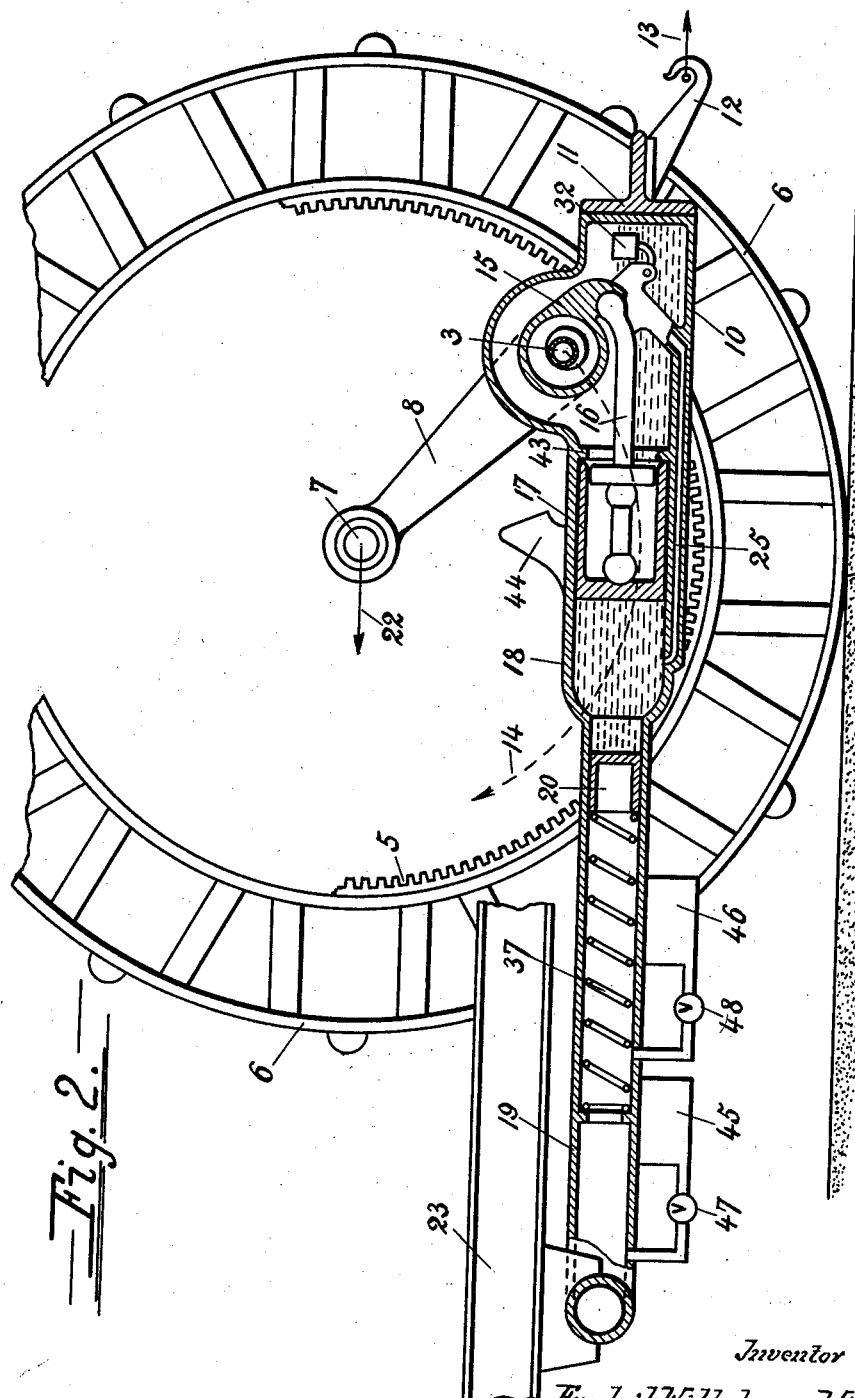

Patented June 1, 1937

2,082,040

UNITED STATES PATENT OFFICE 2,082,040

POWER TRANSMISSION

Fredrik Wilhelmson Wilkens, Mannheim, Germany

Application August 19, 1935, Serial No. 36,829
In Germany August 21, 1934

19 Claims. (Cl. 180—10)

The present invention relates to a continually acting power transmission which is particularly applicable to tractors.

An object of the present invention resides in the provision of a power transmission particularly for tractors whereby the tractive power can be temporarily increased without unduly increasing the output of the motor.

Another object of this invention resides in the provision of a power transmission particularly for tractors comprising a resilient coupling between the source of power and the tractor wheels, which coupling acts only temporarily whenever the tractive effort must be increased and whereby the fly wheel effect of the source of power is used for overcoming a temporary resistance, and undue loads and shocks are withheld from the machinery such as gears and from the tractor structure and wheels, and whereby the time available for adjusting the motor to the increased load conditions is increased.

In conventional tractors, particularly when used for farm work, the motor is very often stopped when the tractor or device pulled by it, for example, the plough, runs against an obstacle such as a stone or root. This is because the motor is rigidly coupled with the driving wheels. As a rule, no time is available for increasing the output of the motor, and the capacity of the motor is not large enough to overcome such unforeseen obstacles. The provision of resilient draw bars is not satisfactory because the movement of the tractor relative to that of the device pulled by the tractor allowed by such resilient draw bars is not large enough to permit readjustment of the motor. In such cases, the full momentum of the fly wheel acts on the gears and causes breakage.

The starting of such conventional tractors is particularly difficult. When used for farm work the velocities at which the apparatus is operated are usually very slow, and there is not enough momentum to permit operation of the speed changing gear; the result is that the motor is killed. To overcome these difficulties, motors have been provided of sufficient capacity to supply the starting and accelerating power without using a different gear ratio than is used for normal operation. Such motors are then too large for the smaller power required when the tractor is moving; a motor which is operated only at partial load during the normal work has an unduly great fuel consumption aside from the fact that its first cost is unduly high.

Further and other objects of the present invention will be hereinafter set forth in the accompanying specification and claims and shown in the drawings which, by way of illustration, show what I now consider to be a preferred embodiment of my invention.

In the drawings:

Fig. 1 is a part sectional rear view of the apparatus according to my invention as attached to a conventional car, and looking from behind into the apparatus and car.

Fig. 2 is a part sectional longitudinal side view of the apparatus according to my invention.

Fig. 3 shows in enlarged scale a detail of the apparatus shown in Figs. 1 and 2.

Like parts are designated by like numerals in all figures of the drawings.

In Figs. 1-3, the present invention is shown by way of example as used in connection with a conventional motor car comprising motor 42, flywheel 41, speed changing gear 40, transmission shaft 39, and bevel gear 38. The rear wheels are removed, and the apparatus according to my invention is attached to the rear axles instead of the rear wheels. As a rule, new tractors will be equipped with the apparatus according to my invention, a conventional passenger car may be chosen for the purpose of the present application in order to demonstrate the universal applicability of the present invention.

Referring more particularly to the drawings: 1 in Fig. 1 is part of the rear axle of the car. The rear wheels are replaced by large tractor wheels 6 which are connected with the axle in the manner according to my invention and as will now be described. 2 are the bolts by means of which usually the rear wheel is connected to the axle; instead of such a rear wheel, extension part 3 is connected to the axle 1 by means of bolts 2; at its outer end, part 3 carries a pinion 4. The latter engages spur gear 5 of the tractor wheel 6. Member 8 is connected to the axle 7 of tractor wheel 6 and has an extension 9 which rotatably carries part 3. Extension 9 rotatably moves within casing 10. Arrangements as described so far are provided on both ends of the axle 1 and the casings 10 are interconnected by the transverse member 11 which carries a hook 12 which can be clearly seen on Fig. 2 of the drawings. To this hook, the apparatus to be pulled by the tractor, for example, a plough, can be connected and exerts a force 13 on the hook which must be overcome by the tractor.

Assuming that axle 7 and pinion 4 are rigidly held in position with respect to the car and pinion 4 is rotated, the tractor wheel is rotated according to the gear ratio between pinion 4 and spur gear 5. As soon as a load 13 is attached to hook 12, reaction forces are developed in axles 7 and 3 which tend to move axle 7 to the right and axle 3 to the left as viewed in Fig. 2. If axle 3 is movable with respect to the car and tractor wheel 6, it rolls to the left on spur gear 5 as indicated by the dotted line arrow 14 in Fig. 2, and wheel 6 stands still. In this case, part 3 rotates member 8 around axle 7 in clockwise direction. Such an effect is desired only to a limited degree, and extension 9 is therefore provided with a lever 15 which movably engages rod 16; the latter movably engages piston 17 sliding within cylinder 18. The latter is connected with casing 10 and communicates with the interior thereof. Cylinder 18 has an extension 19 containing a further piston 20; the interior of cylinders 18 and 19 in between pistons 17 and 20 is filled with a liquid. Cylinder 19 is supportingly connected with the tractor body 23, is closed at the end remote from cylinder 18, and is filled with a resilient agent, for example, air, gas, and/or a spring member 37. An abutment 43 is provided which limits the movement of piston 17 to the right as viewed on Fig. 2. Cylinder 19 is connected with the framework 23 of the tractor car, and the reactive force of the resilient agent exerts a lifting force on the car, whereby the load on the front axle of the car is reduced and the weight acting on the rear wheels 6 increased.

Abutment 44 connected with the cylinder body 18 limits the movement of member 8 in clockwise direction.

As long as the reaction force is in equilibrium with the pressure of piston 17, member 8, which may be called a lever, maintains the position shown in Fig. 2. If, however, the draw bar pull is increased, axle 7 and wheel 6 will stop or reduce their velocity. Pinion 4 then rolls to the left until the pressure on piston 17 is equal to the force acting on hook 12. Motor 42 continues to rotate even if wheel 6 stands still. Fly wheel 41 which is slowed up supplies additional energy and increases the tractive force. The operator, noticing the slowing up, will then give more gas or, in case there is an automatic governor on the engine this will act, and the power of the motor will be increased until the obstacle which caused the slowing up is overcome. Piston 17 moves lever 8 back into the original position which is shown in Fig. 2. The power accumulated in the agent in cylinder 19 forces pistons 17 and 20 backwards as seen in Fig. 2 and augments the power of the engine acting on pinion 4. Wheel 6 is then moved in the direction of arrow 22.

The new method of driving the rear wheel of the tractor assures that the motor can keep on running if the apparatus pulled by the tractor, for example, a plough, runs against an obstacle because at reduced speed of the apparatus pulled by the tractor the force transmitted is automatically changed. By the arrangement according to my invention, mechanical shocks are withheld from the car body; the wheels, which in conventional arrangements suffer the greatest shocks, are resiliently interposed into the line of tractive force. Because of the inclined position of lever 8, the movements of which are cushioned, the wheels 6 can give way in case of unevenness in the road, and shocks are withheld from the car body.

In order to render the force of the resilient agent in cylinder 19 adjustable, chambers 45 and 46 may be connected to cylinder 19 by means of valves 47 and 48, respectively. If the interior of these chambers is connected with the interior of cylinder 19 by opening the valves, the size of the air cushion is increased, and the increase of pressure at a movement of pistons 20 and 17 is reduced.

Fig. 3 shows on a larger scale an apparatus for replacing losses of the liquid which operatively connects pistons 17 and 20 and seals the gas cushion in cylinder 19; this apparatus also controls the amount of the liquid acting between these pistons and the position of piston 20 and thereby the pressure of the agent in cylinder 19. The chamber between pistons 17 and 20 is connected with the interior of pump 24 by means of channel 25; 26 is the discharge non-return valve of pump 24 which is held in position by spring 27; 28 is the pump plunger which is reciprocatingly operated by means of eccentric 29 which forms part of the extension 3 attached to axle 7; plunger 28 is resiliently forced against eccentric 29 by means of spring 30. The inlet valve member 31 of pump 24 is controlled by float 32 which carries a two-arm lever 34, 35 adapted to swing around bolt 33 which is connected to the pump casing. Casing 10 is partly filled with the same liquid as is the space between pistons 17 and 20. If the amount of liquid in casing 10 is normal, float 32 is so low that valve 31 is held open by arm 34 of the two-arm lever which then abuttingly, liftingly engages member 31; the pump is then inactive; if the amount of liquid in casing 10 increases because of leakage from the space between pistons 17 and 20, float 32 is lifted, and inlet valve member 31 is set free so that pump 24 acts normally and forces liquid in between pistons 17 and 20. Inasmuch as this arrangement maintains the distance between pistons 17 and 20, it also maintains the pressure of the agent in cylinder 19.

While I believe the above described embodiment of my invention to be a preferred embodiment, I wish it to be understood that I do not desire to be limited to the exact details of design and construction shown and described, for obvious modifications will occur to a person skilled in the art.

What I claim is:

1. Power transmission for vehicles comprising a rotating part, a wheel member operatively connected with and adapted to be rotated by said rotating part, a link member movably connected with said rotating part and with said wheel member and adapted to relatively move and to permit relative movement of said rotating part with respect to said wheel member, a source of power, a body connected to said source and rotatably carrying said rotating part, resilient means connected with said body, a finger-like extension rigidly connected to said link member and adapted to engage said resilient means and to actuate said resilient means upon relative movement of said link member with respect to said wheel member.

2. Power transmission comprising a rotating part, a wheel member operatively connected to and adapted to be rotated by said rotating part, a link member movably connected with said rotating part and with said wheel member and adapted to relatively move and to permit relative movement of said rotating part with respect to said wheel member, a source of power, a body connected to said source and rotatably carrying said rotating part, resilient means, a cylinder connected with said body, two individual pistons within said cylinder, and a pressure transmitting medium within said cylinder and between said two pistons, one of said pistons engaging said resilient means, an extension connected with said link member and adapted to engage the other of said pistons and to thereby transmit movements of said extension to said medium and said first mentioned piston and to thereby actuate said resilient means upon relative movement of said link member with respect to said wheel member.

3. Power transmission for vehicles comprising a rotating part, a wheel member operatively connected with and adapted to be rotated by said rotating part, a link member movably connected with said rotating part and with said wheel member and adapted to relatively move and to permit relative movement of said rotating part with respect to said wheel member, a vehicle body rotatably carrying said rotating part, compression means connected with said vehicle body and movably connected with said rotating part and adapted to be engaged by said link member, said compression means comprising a cylinder filled with an operating medium, and means connected with said compression means and adapted to replace operating medium which may leak out of said cylinder.

4. Power transmission for vehicles comprising a rotating part, a wheel member operatively connected with and adapted to be rotated by said rotating part, a link member movably connected with said rotating part and with said wheel member and adapted to relatively move and to permit relative movement of said rotating part with respect to said wheel member, a vehicle body rotatably carrying said rotating part, compression means connected with said vehicle body and movably connected with said rotating part and adapted to be engaged by said link member, said compression means comprising a cylinder filled with an operating medium, and means connected with said compression means and operatively connected with and driven by said rotating part and adapted to replace operating medium which may leak out of said cylinder.

5. Power transmission for vehicles comprising a rotating part, a wheel member operatively connected with and adapted to be rotated by said rotating part, a link member movably connected with said rotating part and with said wheel member and adapted to relatively move and to permit relative movement of said rotating part with respect to said wheel member, a vehicle body rotatably carrying said rotating part, compression means connected with said vehicle body and movably connected with said rotating part and adapted to be engaged by said link member, said compression means comprising a cylinder filled with an operating medium, a piston adapted to move in said cylinder, a chamber connected with said cylinder and adapted to collect operating medium leaking along said piston out of said cylinder, pump means connected with said compression means and adapted to replace operating medium collected in said chamber, and automatic means in said chamber and connected with said pump means and adapted to control the output of said pump means in accordance with the amount of medium collected in said chamber.

6. Power transmission for vehicles comprising a rotating part, a wheel member operatively connected with and adapted to be rotated by said rotating part, a link member movably connected with said rotating part and with said wheel member and adapted to relatively move and to permit relative movement of said rotating part with respect to said wheel member, a vehicle body rotatably carrying said rotating part, compression means connected with said vehicle body and movably connected with said rotating part and comprising a cylinder closed on one side and a piston movably closing the other side of said cylinder and a compressible medium within said cylinder, said link member having an extension adapted to engage said piston and to thereby compress said medium and to be moved by said medium when it expands.

7. Power transmission for vehicles comprising a rotating part, a wheel member operatively connected with and adapted to be rotated by said rotating part, a link member movably connected with said rotating part and with said wheel member and adapted to relatively move and to permit relative movement of said rotating part with respect to said wheel member, a vehicle body rotatably carrying said rotating part, compression means connected with said vehicle body and movably connected with said rotating part and comprising a cylinder closed on one side and a piston movably closing the other side of said cylinder and a compressible medium within said cylinder, said link member having an extension adapted to engage said piston and to thereby compress said medium and to be moved by said medium when it expands, at least one expansion chamber, a conduit connecting said expansion chamber and said cylinder, and means for closing and opening said conduit thereby increasing and decreasing the space available for and the compression volume of said compressible medium.

8. In a power transmission for vehicles having a body and power-driven rotating means having two lateral ends, two individual units, each unit having means for disconnectably connecting it to one of said lateral ends and comprising a rotating part and a wheel member operatively connected with and adapted to be rotated by said rotating part and having an axle, each unit further comprising a link member movably connected with said rotating part and with said axle and securing swinging movement of said rotating part coaxially with said wheel member driven thereby, and a transverse member rigidly connecting said two units and being separate from said rotating means and from said wheel member and uniting said two units to one single apparatus which can easily be connected to and disconnected from said vehicle body.

9. In a power transmission for vehicles having a body and two power-driven rear axles, two individual units, each unit comprising a rotating part adapted to be attached to one of said rear axles instead of the conventional rear wheel, each unit further comprising a wheel member operatively connected with and being adapted to be rotated by said rotating part and having an axle, a link member movably connected with said rotating part and with said axle and securing swinging movement of said rotating part coaxially with said wheel member driven thereby, and a transverse member rigidly connecting said two units and being separate from said rotating means and from said wheel member and uniting said two units to one single apparatus which can easily be connected to and disconnected from said vehicle body.

10. In a power transmission for vehicles having a body and two power-driven rear axles, two individual units, each unit comprising a rotating part adapted to be attached to one of said rear axles instead of the conventional rear wheel, each unit further comprising a wheel member operatively connected with and being adapted to be rotated by said rotating part and having an axle, a link member movably connected with said rotating part and with said axle and securing swinging movement of said rotating part coaxially with said wheel member driven thereby, resilient means connected to said vehicle body and operatively connected with said link member and adapted to be actuated by and controlling the motion of said link member, a transverse member rigidly connecting said two units and being separate from said rotating means and from said wheel member and uniting said two units to one single apparatus which can easily be connected to and disconnected from said vehicle body, and a hook member rigidly connected with said transverse member, said units when connected to the rear axles of a motor car transforming the car into a tractor in which the tractive force is directly transmitted to said transverse member and the car receives only the reaction forces of the forces driving the car.

11. In a power transmission for vehicles having a body, a rotating part, a wheel member operatively connected with and adapted to be rotated by said rotating part, a link member movably connected with said rotating part and with said wheel member and adapted to relatively move and to permit relative movement of said rotating part with respect to said wheel member, compression means connected with said vehicle body and movably connected with said rotating part, said compression means comprising a cylinder containing a compressible fluid, and a piston member within said cylinder and operatively connected with said link member for compressing said fluid upon relative movement of said link member and said wheel member and for moving said link member upon expansion of said fluid.

12. In a power transmission for vehicles having a body, a rotating part, a wheel member operatively connected with and adapted to be rotated by said rotating part, a link member movably connected with said rotating part and with said wheel member and adapted to relatively move and to permit relative movement of said rotating part with respect to said wheel member, compression means connected with said body and movably connected with said rotating part, said compression means comprising a cylinder containing a compressible fluid, a piston member within said cylinder and operatively connected with said link member for compressing said fluid upon relative movement of said link member and said wheel member and for moving said link member upon expansion of said fluid, and a chamber connected with said cylinder for increasing the interior volume of said cylinder and the volume of said fluid.

13. In a power transmission for vehicles having a body, a rotating part, a wheel member operatively connected with and adapted to be rotated by said rotating part, a link member movably connected with said rotating part and with said wheel member and adapted to relatively move and to permit relative movement of said rotating part with respect to said wheel member, compression means connected with said body and movably connected with said rotating part, said compression means comprising a cylinder containing a compressible fluid, a piston member within said cylinder and operatively connected with said link member for compressing said fluid upon relative movement of said link member and said wheel member and for moving said link member upon expansion of said fluid, a chamber, a conduit connecting said chamber with said cylinder, and means for opening and closing said conduit for fluid flow between said chamber and said cylinder for increasing and decreasing the space available for and the compression volume of said compressible fluid.

14. In a power transmission for vehicles having a body and a source of power mounted thereon, a rotating part operatively connected with and rotated by said source of power, a wheel member adapted to be rotated by said rotating part and having an axle, a link member movably connected to said rotating part and to said axle and securing movement of said rotating part coaxially with respect to said wheel member, connecting means connected to said body and said rotating part, and coupling means connected with said connecting means for attaching an implement to be pulled by said vehicle.

15. In a power transmission for vehicles having a body and a source of power mounted thereon, a rotating part operatively connected with and rotated by said source of power, a wheel member adapted to be rotated by said rotating part and having an axle, a link member movably connected to said rotating part and to said axle and securing movement of said rotating part coaxially with respect to said wheel member, connecting means connected to said body and said rotating part, resilient means connected with said connecting means and said link member for resiliently connecting said link member with said body, and coupling means connected with said connecting means for attaching an implement to be pulled by said vehicle.

16. In a power transmission for vehicles having a body, and a source of power mounted thereon, a rotating part operatively connected with and rotated by said source of power, a wheel member adapted to be rotated by said rotating part and having an axle, a link member movably connected to said rotating part and to said axle and securing movement of said rotating part coaxially with respect to said wheel member, connecting means connected to said body and said rotating part, and a stop member connected with said connecting means for limiting the movement of said link member.

17. Power transmission for vehicles comprising a rotating part, a wheel member operatively connected with and adapted to be rotated by said rotating part, a link member movably connected with said rotating part and with said wheel member and adapted to relatively move and to permit relative movement of said rotating part with respect to said wheel member, a source of power, a body connected to said source and rotatably carrying said rotating part, resilient means connected to said body, a finger-like extension rigidly connected to said link member and adapted to abuttingly engage said resilient means and to actuate said resilient means upon relative movement of said link member with respect to said wheel member, and a casing surrounding said resilient means and said finger-like extension, whereby said means and extension are well protected against mud and dust from the ground.

18. Power transmission for vehicles comprising a rotating part, a wheel member operatively connected with and adapted to be rotated by said rotating part, a link member movably connected with said rotating part and with said wheel member and being adapted to relatively move and to permit relative movement of said rotating part with respect to said wheel member, a source of power, a body connected to said source and rotatably carrying said rotating part, resilient means connected with said body, a crankpin-like member connected to said link member, a finger-like part connected to said crankpin-like member and being adapted to abuttingly engage said resilient means and to actuate said resilient means upon relative movement of said link member with respect to said wheel member.

19. Power transmission for vehicles comprising a rotating part, a wheel member operatively connected with and adapted to be rotated by said rotating part, a link member movably connected with said rotating part and said wheel member and being adapted to relatively move and to permit relative movement of said rotating part with respect to said wheel member, a source of power, a body connected to said source and rotatably carrying said rotating part, resilient means connected with said body, a crankpin-like member connected to said link member, a finger-like part connected to said crankpin-like member and being adapted to abuttingly engage said resilient means and to actuate said resilient means upon relative movement of said link member with respect to said wheel member, and a casing surrounding said resilient means, said crankpin-like member and said finger-like part, whereby said means, member and part are well protected against mud and dust from the ground.

FREDRIK WILHELMSON WILKENS.